United States Patent
Dickie

(10) Patent No.: US 9,959,299 B2
(45) Date of Patent: May 1, 2018

(54) COMPRESSION-AWARE PARTIAL SORT OF STREAMING COLUMNAR DATA

(71) Applicant: International Business Machines Corporation, Armonk, NY (US)

(72) Inventor: Garth A. Dickie, Framingham, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 464 days.

(21) Appl. No.: 14/557,757

(22) Filed: Dec. 2, 2014

(65) Prior Publication Data

US 2016/0154835 A1 Jun. 2, 2016

(51) Int. Cl.
G06F 17/30 (2006.01)

(52) U.S. Cl.
CPC .. *G06F 17/30315* (2013.01); *G06F 17/30336* (2013.01); *G06F 17/30339* (2013.01); *G06F 17/30486* (2013.01); *G06F 17/30516* (2013.01)

(58) Field of Classification Search
CPC ......... G06F 17/30315; G06F 17/30486; G06F 17/30516; G06F 17/30339; G06F 17/30336
USPC ................................................ 707/693, 753
See application file for complete search history.

(56) References Cited

U.S. PATENT DOCUMENTS

| 5,058,144 A | 10/1991 | Fiala |
|---|---|---|
| 5,467,087 A | 11/1995 | Chu |
| 5,603,022 A | 2/1997 | Ng et al. |
| 5,729,228 A | 3/1998 | Franaszek |

(Continued)

FOREIGN PATENT DOCUMENTS

| CN | 101711001 A | 5/2010 |
|---|---|---|
| EP | 2387004 | 11/2011 |

(Continued)

OTHER PUBLICATIONS

Wolfram MathWorld, "Fundamental Theorem of Arithmetic", 2012, retrieved from https://web.archive.org/web/20120704180459/http://mathworld.wolfram.com/FundamentalTheoremofArithmetic.html.

(Continued)

*Primary Examiner* — Jean M Corrielus
(74) *Attorney, Agent, or Firm* — Erik K. Johnson; Edell, Shapiro & Finnan, LLC

(57) ABSTRACT

According to one embodiment of the present invention, a system for sorting data records generates a plurality of data structures associated with corresponding record fields used to sort the data records, and inserts values of the record fields into the corresponding data structures. Each of the data structures comprises one or more ordered parts, and each inserted value is inserted into a part of the corresponding data structure. Each part of a data structure corresponding to a record field having a sort priority immediately below another record field corresponds to a distinct value inserted into a part of the data structure corresponding to the other record field. The system processes the generated data struc- (Continued)

tures to determine sorted data records. Embodiments of the present invention further include a method and computer program product for sorting data records in substantially the same manners described above.

10 Claims, 4 Drawing Sheets

(56) References Cited

U.S. PATENT DOCUMENTS

| | | | |
|---|---|---|---|
| 5,964,842 | A | 10/1999 | Packard |
| 6,195,024 | B1 | 2/2001 | Fallon |
| 6,253,222 | B1 | 6/2001 | Dyer |
| 6,373,986 | B1 | 4/2002 | Fink |
| 6,396,420 | B1 | 5/2002 | Augustine |
| 6,462,680 | B1 | 10/2002 | Hayes |
| 6,577,254 | B2 | 6/2003 | Rasmussen |
| 6,624,761 | B2 | 9/2003 | Fallon |
| 6,885,319 | B2 | 4/2005 | Geiger |
| 7,024,414 | B2 | 4/2006 | Sah et al. |
| 7,139,765 | B1 | 11/2006 | Balkany et al. |
| 7,453,377 | B2 | 11/2008 | Lee et al. |
| 7,529,752 | B2 | 5/2009 | Hinshaw et al. |
| 7,612,694 | B1 | 11/2009 | Schneider |
| 7,647,552 | B2 | 1/2010 | Wan |
| 7,652,596 | B1 | 1/2010 | Sharma |
| 7,991,811 | B2 | 8/2011 | Carlson |
| 8,065,337 | B2* | 11/2011 | Furusho ............ G06F 17/30486 707/796 |
| 8,108,355 | B2 | 1/2012 | Zhang |
| 8,108,361 | B2 | 1/2012 | Netz |
| 8,126,855 | B2 | 2/2012 | Faerber et al. |
| 8,719,322 | B2 | 5/2014 | Bishop |
| 9,350,384 | B2 | 5/2016 | Ackerman et al. |
| 9,356,621 | B2 | 5/2016 | Ackerman et al. |
| 9,405,858 | B2 | 8/2016 | Attaluri |
| 9,450,603 | B2 | 9/2016 | Dickie |
| 9,514,147 | B2 | 12/2016 | Ackerman et al. |
| 9,514,148 | B2 | 12/2016 | Ackerman et al. |
| 9,514,149 | B2 | 12/2016 | Ackerman et al. |
| 9,519,651 | B2 | 12/2016 | Ackerman et al. |
| 9,535,923 | B2 | 1/2017 | Ackerman et al. |
| 9,608,664 | B2 | 3/2017 | Dickie |
| 9,614,543 | B2 | 4/2017 | Dickie |
| 9,628,107 | B2 | 4/2017 | Dickie |
| 2001/0031092 | A1 | 10/2001 | Zeck |
| 2001/0051941 | A1 | 12/2001 | Tonomura |
| 2002/0090141 | A1 | 7/2002 | Kenyon et al. |
| 2003/0028509 | A1* | 2/2003 | Sah .................. G06F 17/30595 |
| 2003/0233347 | A1* | 12/2003 | Weinberg .......... G06F 17/30312 |
| 2004/0107189 | A1* | 6/2004 | Burdick ............ G06F 17/30324 |
| 2007/0115151 | A1 | 5/2007 | Singh |
| 2007/0257824 | A1 | 11/2007 | Harada et al. |
| 2008/0071818 | A1 | 3/2008 | Apanowicz |
| 2008/0189251 | A1 | 8/2008 | Branscome et al. |
| 2008/0270496 | A1 | 10/2008 | Lundvall |
| 2009/0006399 | A1 | 1/2009 | Raman |
| 2009/0137701 | A1* | 5/2009 | Hirabayashi .......... B60C 1/0016 523/157 |
| 2009/0157701 | A1* | 6/2009 | Lahiri .............. G06F 17/30327 |
| 2009/0210467 | A1 | 8/2009 | Iorio |
| 2010/0124381 | A1 | 5/2010 | Bossen |
| 2010/0153064 | A1 | 6/2010 | Cormode et al. |
| 2010/0281079 | A1 | 11/2010 | Marwah et al. |
| 2011/0099295 | A1 | 4/2011 | Wegener |
| 2011/0145308 | A1 | 6/2011 | Duale |
| 2011/0219357 | A1 | 9/2011 | Livshits |
| 2012/0016901 | A1 | 1/2012 | Agarwal et al. |
| 2012/0054225 | A1 | 3/2012 | Marwah et al. |
| 2012/0089579 | A1 | 4/2012 | Ranade et al. |
| 2012/0102056 | A1* | 4/2012 | Guirard ............ G06F 17/30516 707/755 |
| 2012/0109981 | A1* | 5/2012 | Graefe ............. G06F 17/30498 707/752 |
| 2012/0117076 | A1* | 5/2012 | Austermann ..... G06F 17/30542 707/741 |
| 2012/0323929 | A1 | 12/2012 | Kimura |
| 2013/0018889 | A1 | 1/2013 | Jagmohan et al. |
| 2013/0036101 | A1 | 2/2013 | Marwah |
| 2013/0086353 | A1 | 4/2013 | Colgrove et al. |
| 2013/0099946 | A1 | 4/2013 | Dickie et al. |
| 2013/0124467 | A1 | 5/2013 | Naidu et al. |
| 2014/0114926 | A1* | 4/2014 | Anderson ............... G06F 17/30 707/687 |
| 2014/0114968 | A1* | 4/2014 | Anderson ............... G06F 17/30 707/732 |
| 2014/0258307 | A1* | 9/2014 | West ................ G06F 17/30548 707/746 |
| 2015/0066900 | A1* | 3/2015 | Schneider ........ G06F 17/30445 707/718 |
| 2015/0088830 | A1 | 3/2015 | Kamp |
| 2015/0188563 | A1 | 7/2015 | Dickie |
| 2015/0188564 | A1 | 7/2015 | Dickie |
| 2015/0286465 | A1 | 10/2015 | Dickie |
| 2015/0288381 | A1 | 10/2015 | Dickie |
| 2016/0094242 | A1 | 3/2016 | Ackerman et al. |
| 2016/0094243 | A1 | 3/2016 | Ackerman et al. |
| 2016/0098420 | A1 | 4/2016 | Dickie et al. |
| 2016/0098439 | A1 | 4/2016 | Dickie et al. |
| 2016/0154831 | A1 | 6/2016 | Dickie |
| 2016/0154835 | A1 | 6/2016 | Dickie |
| 2016/0196278 | A1 | 7/2016 | Ackerman et al. |
| 2016/0197622 | A1 | 7/2016 | Ackerman et al. |
| 2016/0204797 | A1 | 7/2016 | Ackerman et al. |
| 2016/0204798 | A1 | 7/2016 | Ackerman et al. |
| 2016/0204799 | A1 | 7/2016 | Ackerman et al. |
| 2016/0226512 | A1 | 8/2016 | Dickie |
| 2016/0246810 | A1 | 8/2016 | Ackerman et al. |
| 2016/0246811 | A1 | 8/2016 | Ackerman et al. |
| 2016/0314055 | A1 | 10/2016 | Bagchi |
| 2017/0154075 | A1* | 6/2017 | Anderson ......... G06F 17/30466 |
| 2017/0315968 | A1* | 11/2017 | Boucher .............. G06F 7/544 |
| 2017/0315978 | A1* | 11/2017 | Boucher ............. G06F 17/245 |
| 2017/0315979 | A1* | 11/2017 | Boucher .............. G06F 7/544 |

FOREIGN PATENT DOCUMENTS

| | | |
|---|---|---|
| KR | 1020110053737 A | 5/2011 |
| WO | 2008034213 A1 | 3/2008 |
| WO | 2009058650 | 5/2009 |
| WO | 2013096620 | 6/2013 |

OTHER PUBLICATIONS

Wikipedia.org, "Fundamental theorem of arithmetic", 2013, retrieved from https://en.wikipedia.org/w/index.php?title=Fundamental_theorem_of_arithmetic&oldid=574451066.

Microsoft, "Block-Based Floating Point Texture Compression", An IP.com Prior Art Database Technical Disclosure, http://ip.com/IPCOM/000167464D, Feb. 14, 2008. 9 pages.

IBM, "Practical Two-Cycle Forwarding Mechanism for Floating Point Units", An IP.com Prior Art Database Technical Disclosure, http://ip.com/IPCOM/000116162D, IBM Technical Disclosure Bulletin, vol. 38, No. 08, Aug. 1995, pp. 225-236.

Pool et al., "Lossless Compression of Variable-Precision Floating-Point Buffers on GPUs", ACM, copyright 2011, pp. 1-8.

Isenburg et al., "Lossless Compression of Floating-Point Geometry", copyright CAD Solutions Co., Ltd., CAD'04 Conference, 2004, pp. 1-7.

Steele Jr. et al., "How to Print Floating-Point Numbers Accurately", Proceedings of the ACM SIGPLAN'90 Conference, White Plains, NY, Jun. 1990, ACM 0-89791-364-7/90/0006/0112, pp. 112-126.

Loitsch, Florian, "Printing Floating-Point Numbers Quickly and Accurately with Integers", PLDI'10, Toronto, Ontario, Canada, Jun. 2010, ACM 978-1-4503-0019/10/06, 11 pages.

Isenburg et al., "Lossless Compression of Predicted Floating-Point Values", http://www.cs.unc.edu/~isenburg/lcpfpv/, accessed May 2013, 2 pages.

(56) References Cited

OTHER PUBLICATIONS

Isenburg et al., "Lossless Compression of Predicted Floating-Point Geometry", Jul. 10, 2004, pp. 1-13.
Lindstrom et al., "Fast and Efficient Compression of Floating-Point Data", IEEE Transactions on Visualization and Computer Graphics, vol. 12, No. 5, Sep./Oct. 2006, 6 pages.
"Capture and display of performance profile for dataflow graph", IPCOM000232481D, Nov. 11, 2013, 4 pages.
List of IBM Patents or Patent Applications Treated As Related, Feb. 10, 2016, 2 pages.
List of IBM Patents or Patent Applications Treated As Related, Mar. 19, 2015.
Justin Zobel and Alistair Moffat, "Inverted Files for Text Search Engines". ACM Computing Surveys, vol. 38, No. 2, Article 6 (Jul. 2006). DOI=10.1145/1132956.1132959 http://doi.acm.org/10.1145/1132956.1132959.
Jordi Nin, Anne Laurent, and Pascal Poncelet, "Speed up gradual rule mining from stream data! A B-Tree and OWA-based approach". J. Intell. Inf. Syst. 35, 3 (Dec. 2010), pp. 447-463. DOI=10.1007/s10844-009-0112-9 http://dx.doi.org/10.1007/s10844-009-0112-9.
J. M. Chambers, "Algorithm 410: Partial Sorting [M1]", CACM, vol. 14, Issue 5, May 1971, pp. 357-358.
William Pugh, "A Skip List Cookbook", UMIACS-TR-89-72.1, Jul. 1989, pp. 2-14.
Internet Society et al.; "A Negative Acknowledgment Mechanism for Signaling Compression"; An IP.com Prior Art Database Technical Disclosure; http://ip.com/IPCOM/000125196D; May 24, 2005.

Tagliasacchi, M. et al.; "Transform coder identification based on quantization footprints and lattice theory"; Department of Electronics and Information, Milano College, Milano Italy; Nov. 19, 2012.
Euclid, "Elements," Books 7 and 10, c. 300 BC; http://aleph0.clarku.edu/~djoyce/java/elements/toc.html.
Baek, Seung Jun, et al.; "Minimizing energy consumption in large-scale sensor networks through distributed data compression and hierarchical aggregation." Selected Areas in Communications, IEEE Journal on 22, No. 6 (2004), 10 pages.
Yang, Dow-Yung, et al; "Compression of particle data from hierarchical approximate methods." ACM Transactions on Mathematical Software (TOMS) 27, No. 3 (2001): 317-339.
Wikepedia, "Charles Joseph Minard", Sep. 26, 2014, 4 pages.
Friedman, "Data Visualization: Modern Approaches", Smashing Magazine, Aug. 2, 2007, 29 pages.
Wiegand, "Google Analytics Flow Analysis—Early Insights", Analytics Review, Jan. 15, 2013, 6 pages.
IBM, "Information as service from Server Explorer in Microsoft Visual Studio .Net", IP.com, IPCOM000139374D, Aug. 22, 2006, 5 pages.
Raman et al., "DB2 with BLU Acceleration: So Much More than Just a Column Store", Proceedings of the VLDB Endowment, vol. 6, No. 11, Copyright 2013, VLDB Endowment 2150-8097/13/09, 12 pages.
List of IBM Patents or Patent Applications Treated As Related, Apr. 20, 2016, 2 pages.

\* cited by examiner

COMPRESSION-AWARE PARTIAL SORT OF STREAMING COLUMNAR DATA

BACKGROUND

Present invention embodiments relate to database technology, and more specifically, to a column-oriented partial sort for data that may include compressed columns.

Database systems often have to sort the results of a query based on one or more columns to produce a limited number of results. For example, to find the ten customers that account for the most profit, a company's database system may compute the profit for each customer, sort the customers by those numbers, and keep only the top ten results. This operation is referred to as a "partial sort" or "top N sort."

In a column-oriented database system, sets of records may be represented as separate streams of data, one stream per column of data. The data in the streams may be in compressed forms. A column-oriented database system may perform a partial sort by decompressing the data, transposing the data into row-oriented record form, and applying a conventional partial sort algorithm to the transposed data. However, this approach incurs the overhead of decompressing and transposing the data.

SUMMARY

According to one embodiment of the present invention, a system for sorting data records generates a plurality of data structures associated with corresponding record fields used to sort the data records, and inserts values of the record fields into the corresponding data structures. Each of the data structures comprises one or more ordered parts, and each inserted value is inserted into a part of the corresponding data structure. Each part of a data structure corresponding to a record field having a sort priority immediately below another record field corresponds to a distinct value inserted into a part of the data structure corresponding to the other record field. The system processes the generated data structures to determine sorted data records. Embodiments of the present invention further include a method and computer program product for sorting data records in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments provide a partial sort operation for data that may have a column-oriented format and may be compressed. An embodiment of the present invention maintains a data structure (referred to as a "partitioned multi-set") for each sort column. Each partitioned multi-set is capable of containing N values corresponding to the top N records seen so far. Values are inserted into a partitioned multi-set by identifying an existing partition into which they are to be inserted, or by requesting a new partition at a particular point in a sequence of partitions. Within each partition, values are stored in sorted order along with a count of the number of occurrences of that value in the partition. A result of inserting a value into a partitioned multi-set is an insertion key (also referred to as an edit instruction or instruction) to be used for inserting the next sort column into its own partitioned multi-set. This forms a cascade, with one partitioned multi-set per sort column. One aspect of a present invention embodiment is to reduce the overhead of decompressing and transposing column-wise data. Only the final N rows need be transposed from columnar format. And during the sort operation most values will never be decompressed if N is small.

Figure 1:
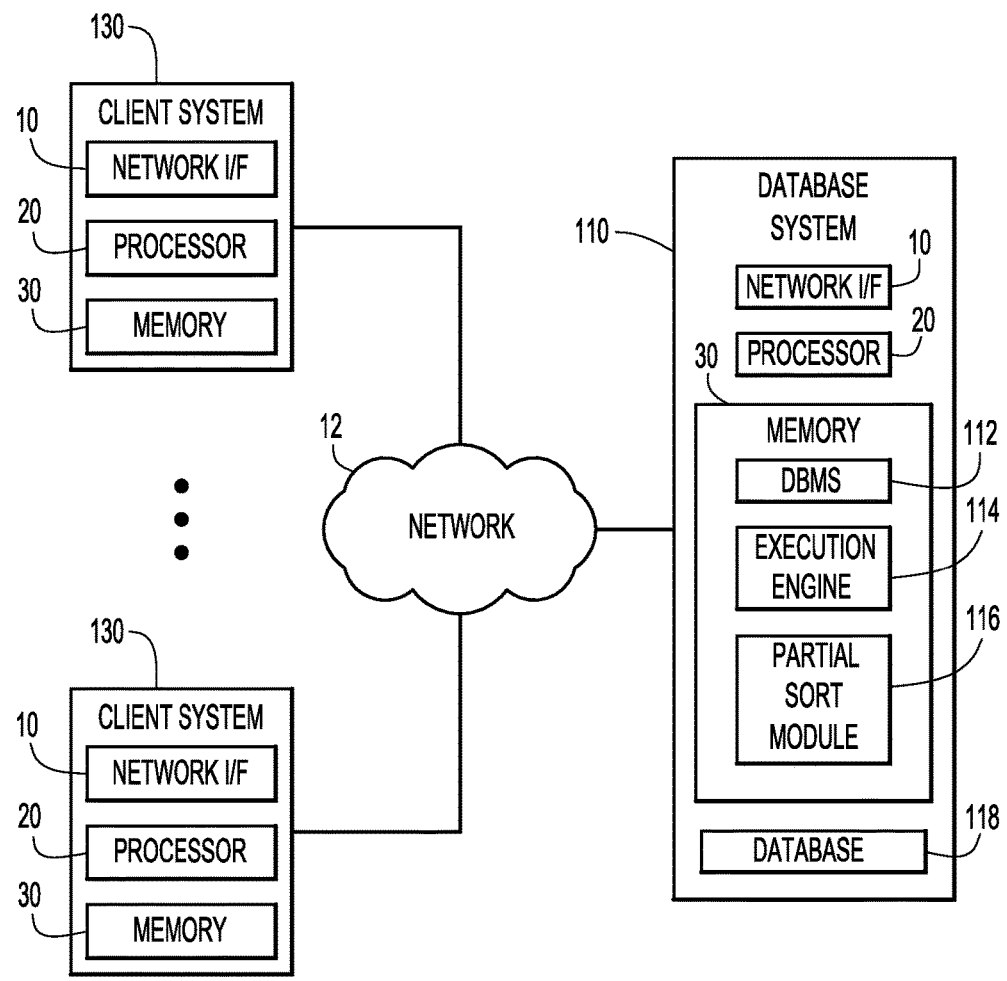
FIG. 1 is a diagrammatic illustration of an example environment for an embodiment of the present invention.

An example environment for present invention embodiments is illustrated in FIG. 1. Specifically, the environment includes database system 110 and one or more client systems 130. Database system 110 and client systems may be remote from each other and communicate over a network 12. Network 12 may be implemented by any number of any suitable communications media (e.g., wide area network (WAN), local area network (LAN), Internet, intranet, etc.). Alternatively, any number of client systems 130 and/or database system 110 may be local to each other, and communicate via any appropriate local communication medium (e.g., local area network (LAN), hardwire, wireless link, intranet, etc.).

Database server system 110 may include database management system (DBMS) 112, execution engine 114 and database 118. Execution engine 114 includes partial sort module 116. Any combination of DBMS 112, execution engine 114, partial sort module 116, and database 118 may be implemented across plural computer processing or storage systems. Alternatively, the partial sort module may reside on a client system 130 or other computer system in communication with the client system.

Client systems 130 enable users to communicate with the DBMS (e.g., via network 12). The client systems may present any graphical user (e.g., GUI, etc.) or other interface (e.g., command line prompts, menu screens, etc.) to receive commands from users and interact with the DBMS and/or other modules or services.

Database server system 110 and client systems 130 may be implemented by any conventional or other computer systems preferably equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and any commercially available and custom software (e.g., index software, database software, etc.).

The database server system, client system, DBMS, execution engine, and/or partial sort module may include one or more modules or units (e.g., partial sort module, etc.) to perform the various functions of present invention embodiments described below (e.g., inserting values into a partitioned multi-sets, inserting values into partitions, generating insert instructions, reading sorted results out of partitioned multi-sets, etc.), may be implemented by any combination of any quantity of software and/or hardware modules or units, and may reside within memory 30 of a server system and/or client systems for execution by processor 20.

Figure 2:
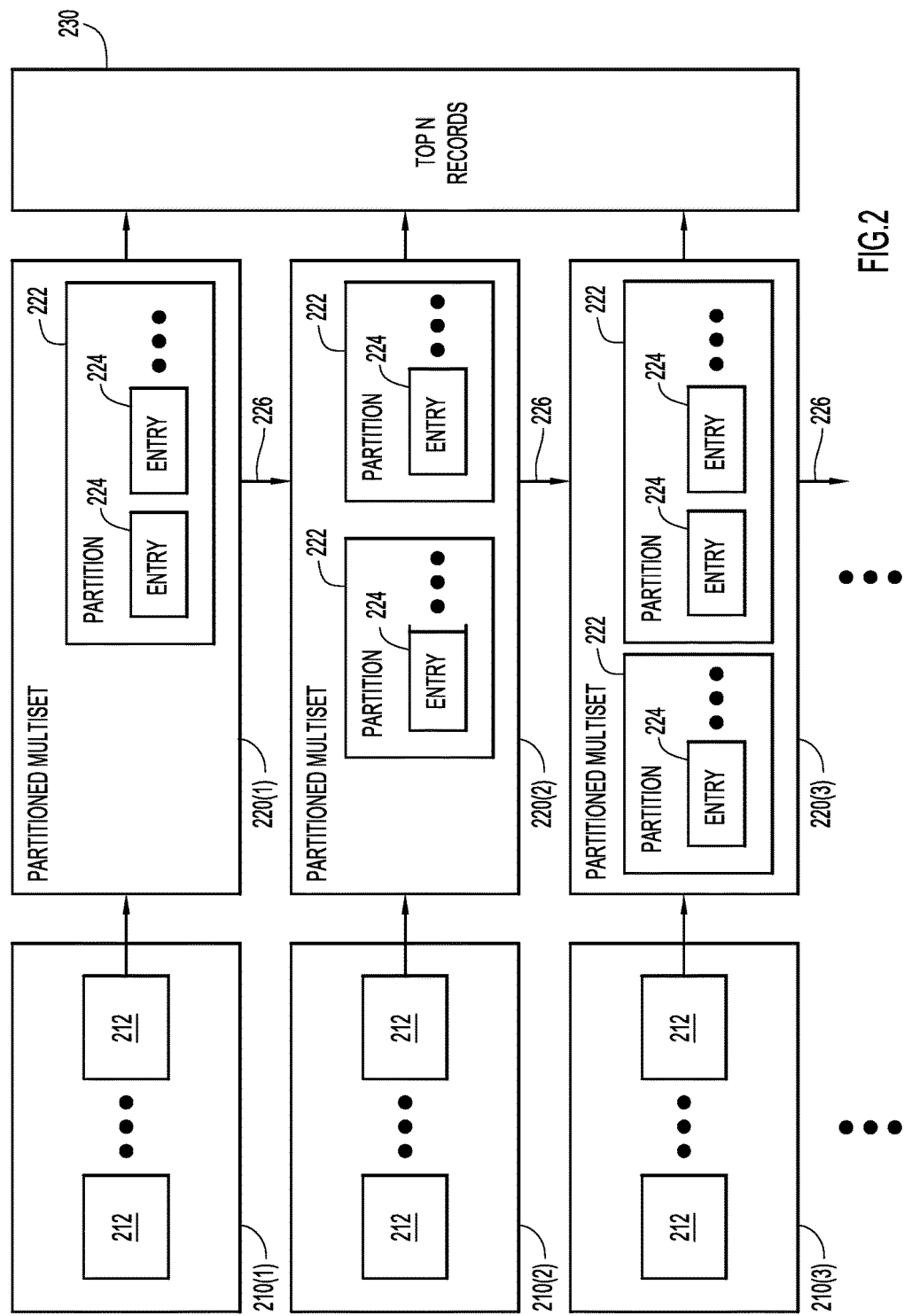
FIG. 2 is a block diagram of example data structures for a partial sort operation according to an embodiment of the present invention.

Example data structures for a partial sort operation according to an embodiment of the present invention are illustrated in FIG. 2. In particular, data for each column to be included in the sort may be provided in a separate data stream 210. Each stream comprises a sequence of chunks 212. Each chunk contains data representing column values for a group of records (e.g., hundreds of records, thousands of records, etc.), and may include an upper and lower bounds on the values contained in the chunk. The chunks may be compressed (e.g., dictionary-encoded, run-length encoded, etc.). If a column is nullable, there may be two streams 210 for that column: a first stream of Boolean values indicating whether the column is null, and a second stream for values when the column is non-null. Streams 210 are assigned an order according to the significance of their associated column for the sort operation. For example, the streams may be denoted 210(1), 210(2), 210(3), etc., where stream 210(1) provides the most significant values, stream 212(2) provides the next most significant values, and so on.

For each stream 210, partial sort module 116 allocates a corresponding partitioned multi-set 220. For example, partitioned multi-set 220(1) corresponds to stream 210(1), partitioned multi-set 220(2) corresponds to stream 210(2), and so on. After inserting data, each partitioned multi-set 220 comprises one or more partitions 220. The partitions are ordered within each partitioned multi-set (e.g., first partition, second partition, etc.). Each partition 222 includes one or more entries 224. Each entry comprises a value and a count (or multiplicity) for that value. The entries within a partition are ordered according to their values. The first partitioned multi-set, 220(1), which corresponds to the most significant column section for the sort, will have a single partition 222. Each succeeding partitioned multi-set 220($i$+1), corresponding to the ($i$+1)th most significant column section, will have one partition 222 for each entry 224 of the preceding partitioned multi-set 220($i$). Accordingly, the partitioned multi-sets may be considered as having a tree structure. However, entries need not include direct links or pointers to their corresponding partitions in another partitioned multi-set, or vice versa.

By way of example, consider three records (A, 100, false), (A, 100, true), and (A, 200, false). The first field is most significant for the sort and the third field is least significant. The data may be represented in partitioned multi-sets as shown in Table 1 below. In Table 1, entries are expressed in the form V×N, where V is the value and N is the count. Square brackets delimit entries belonging to the same partition. The single partition of the partitioned multi-set for the first column has one entry, with value A and count three, because the first column has one distinct value, A, which occurs in three records. The partitioned multi-set for the second column has one partition—corresponding to the one entry in the first partitioned multi-set—with two entries, 100×2 and 200×1, corresponding to the two distinct values of the second column. The partitioned multi-set for the third column has two partitions corresponding to the two entries in the second partitioned multi-set: the first partition contains entries false×1 and true×1, and the second partition contains the entry false×1.

TABLE 1

| Column | Partitioned Multi-set | | |
|---|---|---|---|
| 1$^{st}$ | [A × 3] | | |
| 2$^{nd}$ | [100 × 2 | | 200 × 1] |
| 3$^{rd}$ | [false × 1 | true × 1] | [false × 1] |

The final top N records 230 may be generated from the partitioned multi-sets. In particular, sorted results for each column or column section may be determined independently by reading out in order the entries of the corresponding partitioned multi-set. For example, the run-length encoded values from Table 1 are A×3 for the first column; 100×2, 200 for the second column; and false, true, false for the third column. By way of this run-length encoding, the output of the sort operation is already naturally compressed, which may accelerate downstream data processing. Thus, top N records 230 may be produced, e.g., in column-wise format for downstream processing, or converted to row-wise format.

In an embodiment, a partitioned multi-set may be implemented as an ordered collection (e.g., linked list, balanced tree, skip list, etc.) of partitions, and a partition may be implemented as an ordered collection (e.g., linked list, balanced tree, skip list, etc.) of entries. Each partitioned multi-set and each individual partition may include a running count of the number of entries it contains, the highest and lowest values it contains, and/or other metadata.

Figure 3:
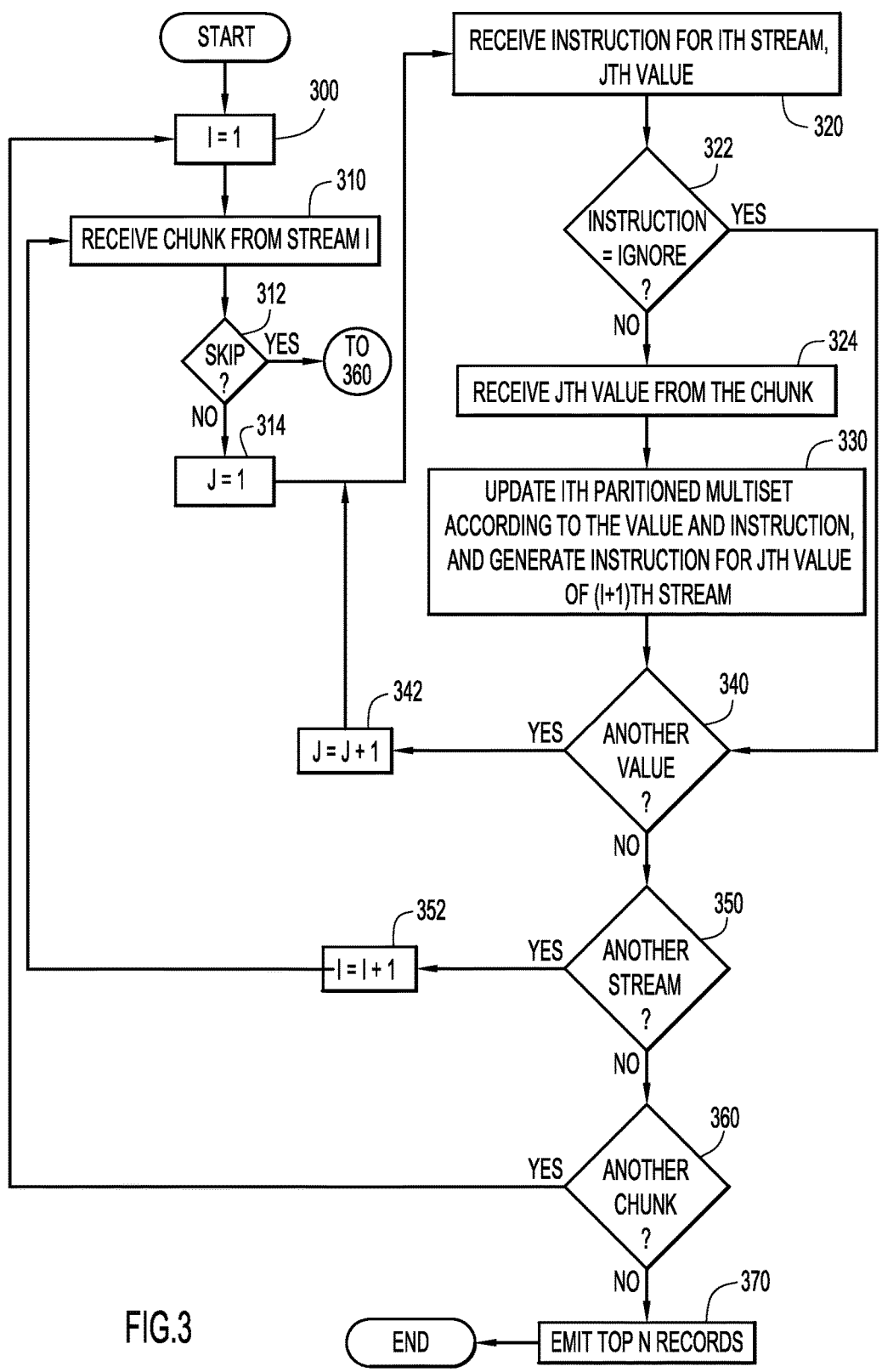
FIG. 3 is a flow diagram illustrating an example manner of performing a partial sort according to an embodiment of the present invention.

An example manner of performing a partial sort according to an embodiment of the present invention is illustrated in FIG. 3. The partial sort module processes column data according to the priority of the column for the sort. At step 300, a stream identifier i is initialized to refer to the stream providing the most significant values (e.g., i=1). At step 310, the partial sort module receives a chunk 212 from stream 210($i$).

At step 312, the partial sort module may determine whether to skip the received chunk. For example, if the number of requested records has already been processed, and the chunk metadata indicates that the chunk contains no values within the candidate range given by the maximum or minimum values in partitioned multi-set, then the current chunk and the corresponding chunks from the other streams may be skipped, and processing may proceed to step 360. If the chunk is not skipped, the partial sort module initializes a value identifier j at to refer to the first value in the chunk step 314.

At step 320, the partial sort module receives an instruction 226 (FIG. 2) for the jth value of the chunk. At step 322, the partial sort module determines whether the instruction is to ignore the value. If so, processing proceeds to step 340. Otherwise, the instruction indicates a position of a partition within partitioned multi-set 220($i$) to insert which the value into. In addition, the instruction indicates whether the value is to be inserted into an existing partition at that position or into a new partition that is to be created and placed at that position.

The partial sort module receives the jth value of the chunk at step 324 and updates partitioned multi-set 220($i$) at step 330 by inserting the value into a new or existing partition according to the instruction. In addition, the partial sort module generates an instruction for inserting the jth value of the (i+1)th stream.

At step 340 the partial sort module determines whether another value remains to be processed in the chunk. If so, the value identifier j is incremented at step 342, and processing returns to step 320. Otherwise, the partial sort module determines at step 350 whether another stream remains to be processed for the current group of records. If so, the column section identifier i is incremented at step 352, and processing returns to step 310. Otherwise, the partial sort module determines at step 360 whether more chunks remain to be processed in the streams. If so, processing returns to step 300. Otherwise, the partial sort module emits the top N records 230 at step 370 by reading out the ordered entries of each partitioned multi-set as discussed with respect to FIG. 2.

Figure 4:
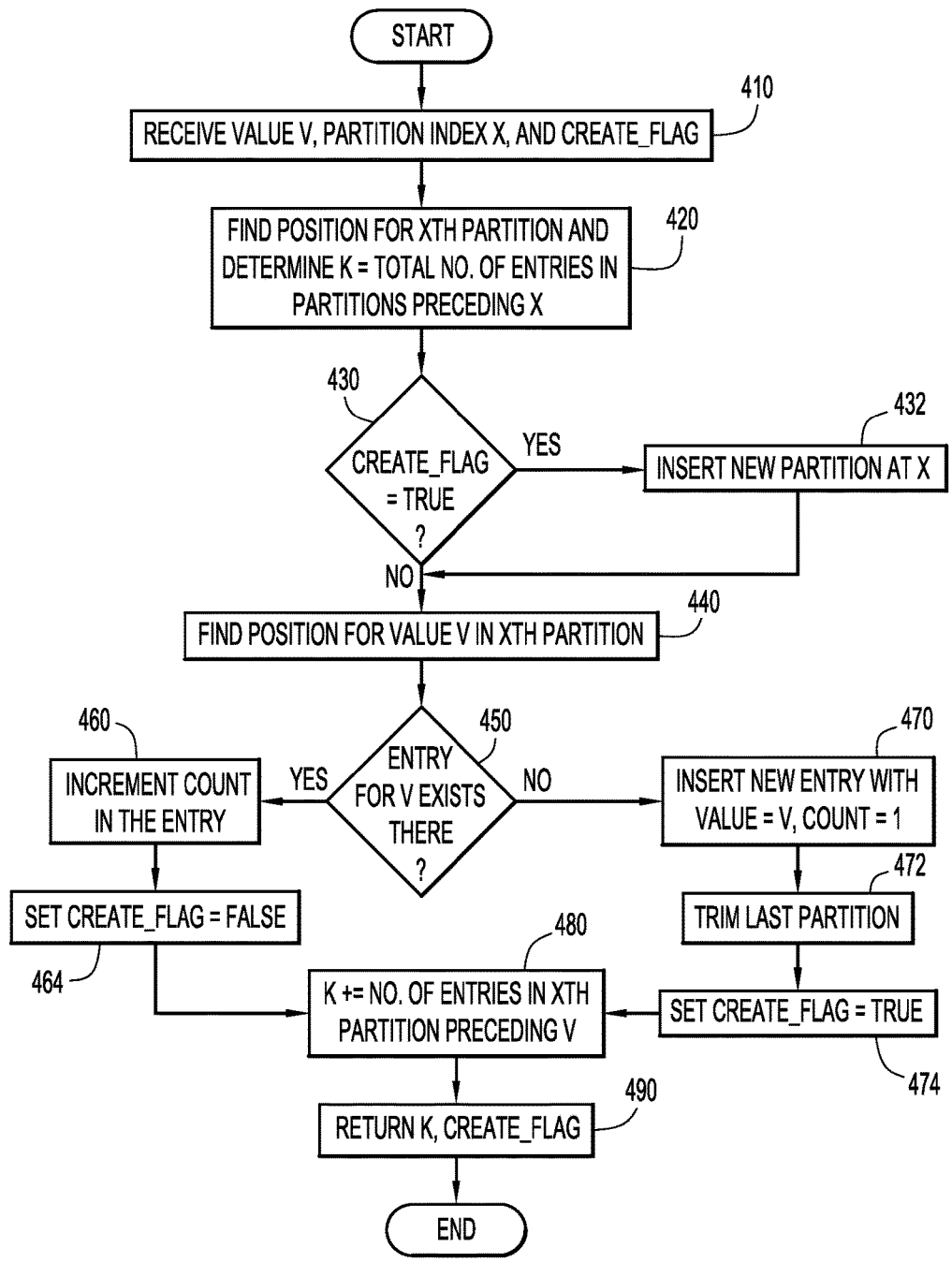
FIG. 4 is a flow diagram illustrating an example manner of inserting a column value into a partitioned multi-set according to an embodiment of the present invention.

An example manner of inserting a column value into a partitioned multi-set according to an embodiment of the present invention in which partitioned multi-sets 220 and partitions 222 are implemented using ordered data structures (e.g., linked list, balanced tree, etc.) is illustrated in FIG. 4. Initially, at step 410, the partial sort module receives a column value V, a partition position X, and a Boolean flag referred to as the create flag. The value V is to be inserted into a partition at position X in the partitioned multi-set (i.e., into the Xth partition in the partitioned multi-set). The flag indicates whether to create and insert a new partition at position X or to insert the value into an existing partition at position X.

At step 420, the partial sort algorithm finds the position for the Xth partition and determines a count K of the total number of entries in partitions preceding X. For example, the partial sort algorithm may initialize K to zero, and locate the position for the Xth partition by starting at the first partition and stepping from one partition to the next in order X times. At each step from a position P to position P+1, K is incremented by the number of entries in the partition at P.

At step 430, the partial sort module determines whether the create flag is true. If so, a new, empty partition is created and inserted into the partitioned multi-set at step 432.

At step 440, the partial sort module finds the position for the value V within the Xth partition. For example, the partial sort module may start at the first entry in the partition and step from one entry to the next in order until the position for V is found. Along the way, the partial sort module counts the number of entries in the partition that precede the position for the entry for V.

If an entry with the value V is found to already exist in the partition at step 460, the count in that entry is incremented by one at step 460, and a Boolean flag is set to false at step 464 to indicate that a new entry was not created for this value. Processing then proceeds to step 480.

If an entry for the value V does not exist in the partition at step 460, the partial sort module inserts a new entry with value V and count 1 at the found position at step 470. At step 472, the partial sort module may trim the last partition in the multi-set to remove entries that will not contribute to the top N results. For example, inserting the new entry at step 470 may cause the number of entries in the partitioned multi-set to exceed the number of records requested in the partial sort. If so, the partial sort module may remove the last entry of the last partition. If this will leave the last partition empty, the last partition may be removed. In addition, a Boolean flag is set to true at step 474 to indicate that a new entry was created for the value V.

At step 480, the partial sort module adds to K the number of entries in the Xth partition that precede the entry for the value V. As a result, K represents the number of entries in the partitioned multi-set that precede the entry for the current value V (including entries in any preceding partitions).

At step 490, the partial sort module returns K and the flag set at step 464 or 474. The flag and K may be used as instruction 216 for inserting the jth value of the next chunk in stream 210(i+1), which belongs to the same record as the current value V. K indicates the position of the partition in the next partitioned multi-set, and the flag indicates whether to create a new partition for value.

Accordingly, embodiments of the present invention may facilitate processing of column compressed data streams. For example, in the course of performing a partial sort on streaming data, it may often happen that all of the values in a chunk fall outside of the range for the top N results: e.g., the edit instructions may indicate the records will fall outside of the top N results based on a previous column; or the edit instructions may put all of the rows into the last partition, and the minimum value for the chunk may exceed the maximum value in the partition. In these cases a present invention embodiment may proceed without looking at the internals of the chunk at all.

When the leading sort columns are constant, single partitions, containing a single value will result, and the edit instructions for succeeding column streams are simply to insert the value into the single existing partition. As result, there is no cost downstream from leading constant columns in the sort.

Optimizations for run-length encoded data and dictionary-encoded data further reduce the work required for the sort. If the contents of a chunk are run-length encoded and the instructions for a chunk are simple (for example a constant "insert into partition 1" as will always be the case for the first column), then the iteration over values in FIG. 3 can instead iterate over runs, using a single update to the partitioned multi-set per run of identical values. In this case the data structure update is more complicated. Suppose the repeat count for a value V is M. At 460 the count in an entry is increased by M, or at 470 the count for a new entry is set to M rather than 1. At 490, the update operation returns M instructions, either (K, false) if the 460 branch was chosen, or (K, true) followed by M−1 instructions (K, false) if the 470 branch was chosen.

If the contents of a chunk are dictionary encoded and the input instructions are constant (as in the first column), then some optimization may be obtained by remembering positions in the partitioned multi-set for each dictionary entry after the first time it occurs. This reduces the most significant part of the computational complexity to depend on the number of distinct dictionary entries rather than the number of values in the chunk.

By the nature of partial sort, the fraction of "interesting" records tends to go down as processing proceeds through the streams of data. As a result, many chunks end up with edit instructions that are mostly to ignore values. In these cases the partial sort module may look at only a few values from the compressed sort column. Picking out these few values can be done without decompressing the whole chunk of data. The amount of work to be done is therefore proportional to the number of "interesting" records, rather than the total number of records. In the extreme, an entire chunk of values will arrive with an "ignore" instruction and can be ignored without decompression or further inspection.

According to another embodiment of the present invention, a partitioned multi-set may be implemented using balanced trees with a count of leaves below each internal node, or with skip list data structures, so that a value may be inserted into the partitioned multi-set without performing linear searches to locate the position of a partition within the partitioned multi-set or the position for an element within a partition.

For example, each partition may be a skip list data structure used to map column values to counts of the number of occurrences of that value in the partition. This provides look-up and insertion of an entry into a partition at step 440 (FIG. 4) in $O(\log(m))$ time, where m is the number of entries in the partition. In addition, a skip list may maintain a count (D1) of the number of elements between each node and the preceding node at each level of the node. This enables determining in $O(\log(m))$ time the number of number of entries in a partition that precede the entry for a given value, which is used at step 480 (FIG. 4).

Each partitioned multi-set may be a skip list data structure with partitions at each node of the skip list. Maintaining a count (D2) of the number of elements between each node and the preceding node at each level of the skip list enables finding the position for the Xth partition at step 420 in O(log(n)) time, where n is the number of partitions in the partitioned multi-set. In addition, maintaining a count (D3) of the number of entries contained in partitions between each node and the preceding node at each level (in a similar manner as for the counts of elements between nodes at each level) allows for accumulating in (log(n)) time the value K=total number of entries in partitions preceding X at step 420 (FIG. 4). When a new partition is inserted, the count D2 of elements between a node and the preceding node is updated for one node on each level above the leaves, so inserting a partition is an O(log n) operation. When an element is inserted into a partition, the count D1 of elements between nodes is updated in O(log m) levels within the partition, and the count D3 is updated in O(log n) levels in the partitioned multi-set. As a result, a value may be inserted into a partitioned multi-set in O(log m+log n) time.

The data structures and algorithm described here lend themselves to parallel processing of the sort operation. The application of a chunk 212 to a partitioned multi-set 220(*i*) may generate a compressed chunk of instructions 226 without requiring that the instructions 226 be immediately consumed by the downstream partitioned multi-set 220(*i*+1). So each column and multi-set may be processed by a separate thread, process, or processor with only a queue of instructions 226 between each process and the next.

Some columns may not be included in the sort order, but must be sorted along with the columns which determine the sort order. These columns may each be handled by placing their values into a partitioned multi-set according to the instructions generated by the last sort-column partitioned multi-set 220, and retrieving their values from these partitioned multi-sets after all rows are processed.

It will be appreciated that the embodiments described above and illustrated in the drawings represent only a few of the many ways of implementing embodiments for performing partial sort operations.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for sorting any data records having any numbers and types of data fields in any order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for sorting data records comprising:
at least one processor configured to:
generate a plurality of data structures, each of which is associated with a different corresponding record field used to sort the data records, and insert values of the record fields into the corresponding data structures, the values of the record fields being received in a plurality of streams, each of the plurality of streams corresponding to a different respective record field and including a sequence of chunks, each of the chunks including values of a record field corresponding to the stream including the chunk;
insert values of the record fields into corresponding data structures, the values being inserted such that the values are in an order in the corresponding data structures, the inserting comprising:
for each respective value of each chunk of each stream of the plurality of streams, perform:
receiving a respective value and an instruction for a respective entry of a respective stream,
updating the data structure for the respective stream according to the respective value and the instruction, and
generating an instruction for a corresponding entry of a next stream; and
emit a top predetermined number of the sorted data records, the emitting including reading out the inserted values stored in the plurality of data structures, wherein:
each of the data structures comprises one or more ordered parts;
each inserted value is inserted into a corresponding ordered part of the corresponding data structure, the corresponding ordered part further including a count of occurrences of the value; and
each ordered part of a data structure corresponding to a record field having a sort priority immediately below another record field corresponds to a distinct value inserted into an ordered part of the data structure corresponding to the another record field.

2. The system of claim 1, wherein the generating an instruction is for inserting a value of another field of the same record into an ordered part of a partitioned data structure corresponding to the another field.

3. The system of claim 2, wherein inserting a value of a record field into the corresponding data structure is an $O(\log(m)+\log(n))$ operation, where n is a number of ordered parts of the data structure, and m is a number of elements in the ordered part of the data structure the value is inserted into.

4. The system of claim 1, wherein the at least one processor is configured to determine a predetermined quantity of the sorted data records.

5. The system of claim 4, wherein the at least one processor is further configured to:
compress the data records indicated by the data structure based on the count of occurrences of the field values of the corresponding record fields.

6. The system of claim 1, wherein the data records are compressed, and inserting the values of the record fields further comprises:
decompressing selected fields of the data records.

7. The system of claim 1, wherein the data records include streaming column data from a database table.

8. A computer program product for sorting data records comprising:
a computer readable storage medium having computer readable program code embodied therewith for execution on a processing system, the computer readable program code comprising computer readable program code configured to:
generate a plurality of data structures, each of which is associated with a different corresponding record field used to sort the data records, and insert values of the record fields into the corresponding data structures, the values of the record fields being received in a plurality of streams, each of the plurality of streams corresponding to a different respective record field and including a sequence of chunks, each of the chunks including values of a record field corresponding to the stream including the chunk;
insert values of the record fields into corresponding data structures, the values being inserted such that the values are in an order in the corresponding data structures, the inserting comprising:
for each respective value of each chunk of each stream of the plurality of streams, perform:
receiving a respective value and an instruction for a respective entry of a respective stream,
updating the data structure for the respective stream according to the respective value and the instruction, and generating an instruction for a corresponding entry of a next stream; and emit a top predetermined number of the sorted data records, the emitting including reading out the inserted values stored in the plurality of data structures, wherein:

each of the data structures comprises one or more ordered parts;

each inserted value is inserted into a corresponding ordered part of the corresponding data structure, the corresponding ordered part further including a count of occurrences of the value; and each ordered part of a data structure corresponding to a record field having a sort priority immediately below another record field corresponds to a distinct value inserted into an ordered part of the data structure corresponding to the another record field.

9. The computer program product of claim 8, wherein the generating an instruction is for inserting a value of another field of the same record into an ordered part of a partitioned data structure corresponding to the another field.

10. The computer program product of claim 9, wherein the inserting a value of a record field into the corresponding data structure is an $O(\log(m)+\log(n))$ operation, where n is a number of ordered parts of the data structure, and m is a number of elements in the ordered part of the data structure the value is inserted into.

* * * * *